(12) United States Patent
Nakano

(10) Patent No.: US 7,480,348 B2
(45) Date of Patent: Jan. 20, 2009

(54) I/Q DEMODULATION CIRCUIT

(75) Inventor: Yoshiaki Nakano, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 905 days.

(21) Appl. No.: 10/919,441

(22) Filed: Aug. 17, 2004

(65) Prior Publication Data
US 2005/0041759 A1 Feb. 24, 2005

(30) Foreign Application Priority Data
Aug. 18, 2003 (JP) ............................ 2003-294067

(51) Int. Cl.
H04L 27/00 (2006.01)

(52) U.S. Cl. .................. 375/324; 329/323; 329/318; 329/349; 329/359

(58) Field of Classification Search .................. 375/324, 375/328; 329/345, 323, 318, 349, 359
See application file for complete search history.

(56) References Cited

U.S. PATENT DOCUMENTS 5,548,244 A * 8/1996 Clewer ........................ 329/318
6,128,353 A 10/2000 Ho et al.
6,330,290 B1 * 12/2001 Glas ............................ 375/324

FOREIGN PATENT DOCUMENTS

JP 10-303649 A 11/1998

* cited by examiner

Primary Examiner—David C Payne
Assistant Examiner—Rahel Guarino
(74) Attorney, Agent, or Firm—Birch, Stewart, Kolasch & Birch, LLP

(57) ABSTRACT

In an I/Q demodulation circuit, an offset amount determined in an offset detection mode is previously stored so that, in a normal reception mode, an offset is corrected for based on the data thus stored. With this configuration, a DC offset and a phase offset can be corrected for without a delay in an I/Q demodulation operation.

12 Claims, 15 Drawing Sheets

F I G. 1
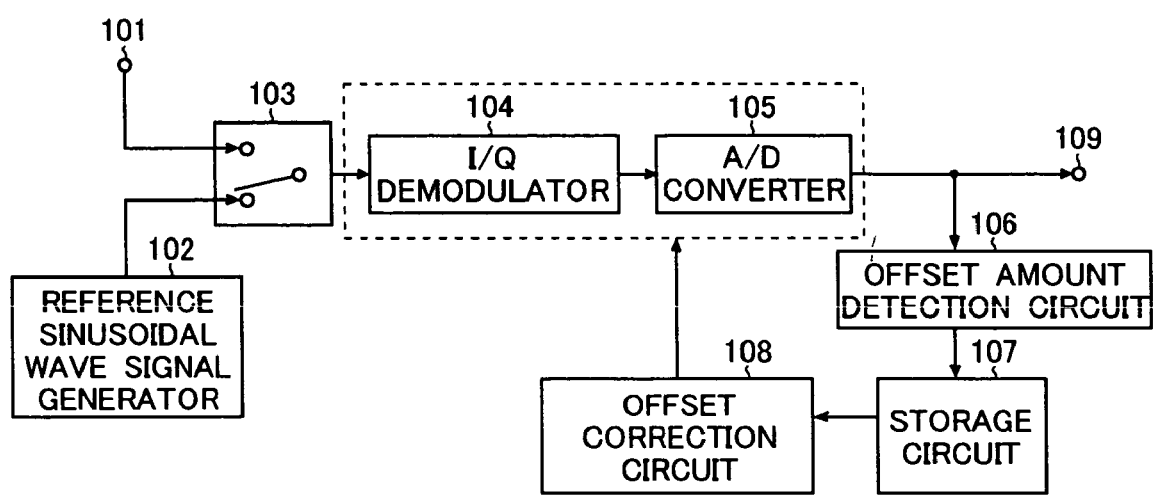

F I G. 1 1
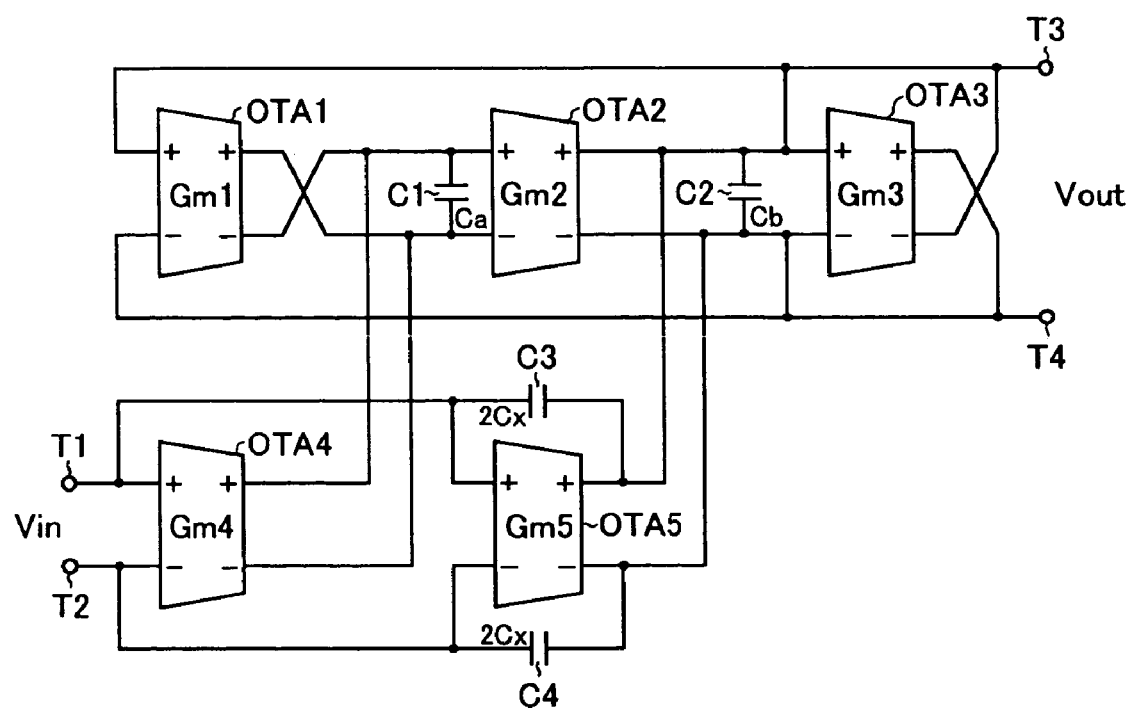

I/Q DEMODULATION CIRCUIT

This nonprovisional application claims priority under 35 U.S.C. § 119(a) on Patent Application No. 2003-294067 filed in Japan on Aug. 18, 2003, the entire contents of which are hereby incorporated by reference.

BACKGROUND OF THE INVENTION

1. Field of the Invention

The present invention relates to an I/Q demodulation circuit as is incorporated in a digital broadcast reception apparatus or the like for the purpose of converting a radio- or intermediate-frequency signal into a predetermined base band I/Q signal.

2. Description of Related Art

When a radio-frequency signal (hereinafter referred to as an RF signal) or an intermediate-frequency signal (hereinafter referred to as an IF signal) is converted into a baseband signal, it is quite likely that a DC offset (an unnecessary DC component that is produced by the leaking output of a local oscillator, variations among individual devices, and the like) is superimposed on the baseband signal. There have conventionally been known mixer circuits that can eliminate such a DC offset (for example, see Japanese Patent Application Laid-Open No. H 10-303649).

FIG. 15 is a block diagram showing the configuration of a principal portion of the mixer circuit disclosed in Japanese Patent Application Laid-Open No. H10-303649. In the mixer circuit shown in this figure, a mixer 2 multiplies an RF or IF signal fed thereto from an input terminal 1 by a local oscillation signal fed thereto from a local oscillator 3, and outputs the multiplication result to an analog-to-digital converter 6 (hereinafter referred to as the A/D converter 6). Between the terminals 4 and 5 of the local oscillator 3, a resonator is externally connected. The oscillation frequency of the local oscillator 3 is so controlled that the multiplication operation performed by the mixer 2 yields a baseband signal having a desired frequency. The A/D converter 6 converts the baseband signal fed thereto into a digital signal, and feeds it out of the mixer circuit via an output terminal 9. The digital baseband signal produced by the A/D converter 6 is also fed to an averaging circuit 7. The averaging circuit 7 detects the average value of the DC offset amount of the digital baseband signal, and outputs it to a sample-and-hold circuit 8 (hereinafter referred to as the S/H circuit 8) provided in the following stage. The S/H circuit 8 reads and holds the average value of the DC offset amount with predetermined timing, and controls the mixer 2 in such a way as to cancel the voltage difference between the average value of the DC offset amount and the design value of the DC offset amount of the mixer 2.

It is true that, with the mixer circuit configured as described above, it is possible to eliminate the DC offset in the digital baseband signal without providing a high-capacitance coupling capacitor in the stage preceding the output terminal 9. This helps reduce the circuit scale.

However, the mixer circuit configured as described above has the following disadvantages. The mixer circuit is so configured that the DC offset amount is measured during a reception operation and is corrected for according to the thus measured value. Thus, the first disadvantage is that the offset is corrected for with a delay at least equal to one period (which is the time required to find the DC average value of the digital baseband signal). In an I/Q demodulator, the demodulation accuracy depends heavily not only on the DC offset but also on the phase offset of an I/Q signal. However, in the mixer circuit configured as described above, no consideration whatever is given to the correction of the phase offset. Thus, the second disadvantage is that applying the prior art intact to an I/Q demodulator does not contribute to satisfactorily enhancing the demodulation accuracy thereof.

SUMMARY OF THE INVENTION

In view of the conventionally encountered problems described above, it is an object of the present invention to provide an I/Q demodulation circuit that, when performing an I/Q demodulation operation, can correct for a DC offset and a phase offset without a delay.

To achieve the above object, according to the present invention, an I/Q demodulation circuit is provided with: an I/Q demodulator for producing an analog I/Q signal by multiplying an input signal by a local oscillation signal; an analog-to-digital converter for converting the analog I/Q signal into a digital I/Q signal; a reference sinusoidal-wave signal generator for producing a predetermined reference sinusoidal-wave signal; a selector for selecting and feeding to the I/Q demodulator one of an external input signal and the reference sinusoidal-wave signal; an offset amount detection circuit for detecting the DC offset amount and phase offset amount of the digital I/Q signal obtained when the reference sinusoidal-wave signal is selected; a storage circuit for storing the result of detection by the offset amount detection circuit or a correction value with which to correct for the result; and an offset correction circuit for correcting for, based on the data stored in the storage circuit, the DC offset and phase offset of the digital I/Q signal obtained when the external input signal is selected.

BRIEF DESCRIPTION OF THE DRAWINGS

FIG. 1 is a block diagram showing the I/Q demodulation circuit of a first embodiment of the invention;

FIG. 11 is a circuit diagram showing an example of the configuration of the variable-phase controlled circuit 704f;

DETAILED DESCRIPTION OF PREFERRED EMBODIMENTS

Figure 2:
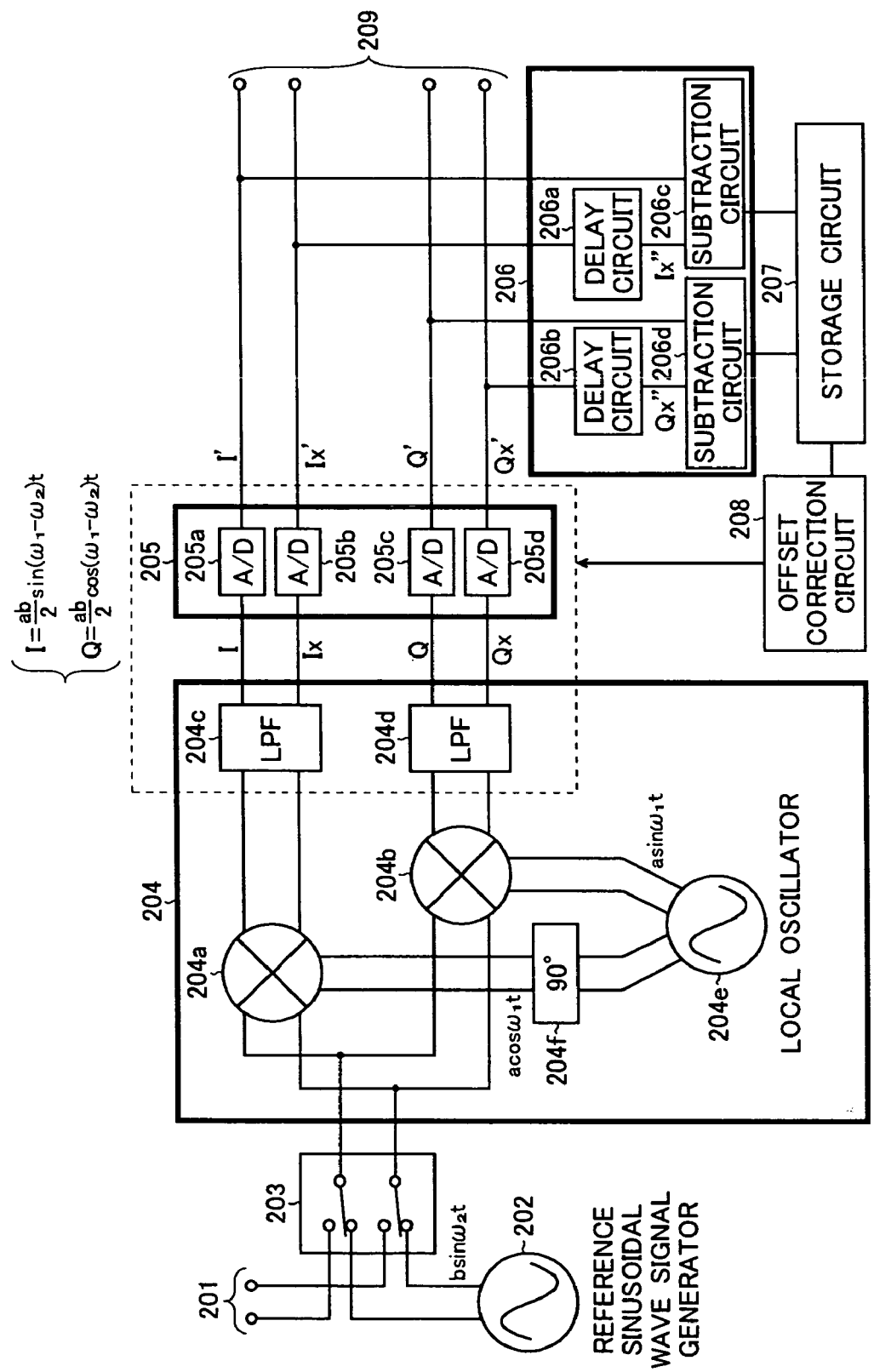
FIG. 2 is a block diagram showing the I/Q demodulation circuit of a second embodiment of the invention.

First, the I/Q demodulation circuit of a first embodiment of the invention will be described. FIG. 1 is a block diagram showing the I/Q demodulation circuit of the first embodiment of the invention. As shown in this figure, the I/Q demodulation circuit of this embodiment includes an input terminal 101, a reference sinusoidal wave signal generator 102, a selector 103, an I/Q demodulator 104, an A/D converter 105, an offset amount detection circuit 106, a storage circuit 107, an offset correction circuit 108, and an output terminal 109. The I/Q demodulation circuit operates in one of the following two operation modes: an offset detection mode and a normal reception mode.

In the offset detection mode mentioned above, the following operations are performed. In this operation mode, the reference sinusoidal wave signal generator 102 produces a predetermined reference sinusoidal wave signal. The selector 103 chooses, as a signal source, the reference sinusoidal wave signal generator 102, and thus feeds the reference sinusoidal wave signal to the I/Q demodulator 104. The I/Q demodulator 104 multiplies the reference sinusoidal wave signal fed from the selector 103 by a local oscillation signal to produce a predetermined analog baseband I/Q signal. The A/D converter 105 converts the analog baseband I/Q signal into a digital baseband I/Q signal, and feeds this to the offset amount detection circuit 106. The offset amount detection circuit 106, by performing predetermined calculations, detects the DC offset amount and phase offset amount of the digital baseband I/Q signal. The storage circuit 107 stores the result of the detection performed by the offset amount detection circuit 106.

By contrast, in the normal reception mode, the following operations are performed. In this operation mode, an external input signal (an RF or IF signal) obtained through a reception operation is fed in via the input terminal 101. The selector 103 chooses, as a signal source, the input terminal 101, and thus feeds the external input signal to the I/Q demodulator 104. The I/Q demodulator 104 multiplies the external input signal fed from the selector 103 by the local oscillation signal to produce a predetermined analog baseband I/Q signal. The A/D converter 105 converts the analog baseband I/Q signal into a digital baseband I/Q signal, and feeds this to the output terminal 109. Meanwhile, according to the data stored in the storage circuit 107, the offset correction circuit 108 corrects for the DC offset and phase offset of the digital baseband I/Q signal. Thus, at the output terminal 109 appears a demodulation result that is free from a DC or phase offset.

As described above, in the I/Q demodulation circuit of this embodiment, the DC offset amount and phase offset amount obtained in the offset detection mode are previously stored in the storage circuit 107 so that, in the normal reception mode, the offsets are corrected for according to the stored data. This configuration eliminates the need to measure and correct for offset amounts during a reception operation, and thus makes it possible to correct for a DC offset and a phase offset without a delay during an I/Q demodulation operation.

Next, the I/Q demodulation circuit of a second embodiment of the invention will be presented to describe the DC offset amount detecting means in more detail. FIG. 2 is a block diagram showing the I/Q demodulation circuit of the second embodiment of the invention. As shown in this figure, the I/Q demodulation circuit of this embodiment, like that of the first embodiment, includes input terminals 201, a reference sinusoidal wave signal generator 202, a selector 203, an I/Q demodulator 204, an A/D converter 205, an offset amount detection circuit 206, a storage circuit 207, an offset correction circuit 208, and output terminals 209.

The I/Q demodulator 204 includes multipliers 204a and 204b, low-pass filters 204c and 204d (hereinafter referred to as the LPFs 204c and 204d), a local oscillator 204e, and a 90-degree phase shifter 204f. The local oscillation signals fed respectively to the multipliers 204a and 204b are given a phase difference of 90 degrees relative to each other by the 90-degree phase shifter 204f. Thus, assuming that the angular frequency and amplitude of the local oscillation signals are $\omega_1$ and a respectively, these signals are represented as a cos $\omega_1 t$ and a sin $\omega_1 t$ respectively. On the other hand, the reference sinusoidal wave signal produced by the reference sinusoidal wave signal generator 202 is represented, assuming that the angular frequency and amplitude thereof are $\omega_2$ and b respectively, as b sin $\omega_2 t$. Hence, the output signals of the multipliers 204a and 204b are given respectively by formula (1) and (2) below.

$$a\cos\omega_1 t \times b\sin\omega_2 t = \frac{ab}{2}[\sin(\omega_1 + \omega_2)t - \sin(\omega_1 - \omega_2)t] \quad (1)$$

$$a\sin\omega_1 t \times b\sin\omega_2 t = \frac{ab}{2}[\cos(\omega_1 - \omega_2)t - \cos(\omega_1 + \omega_2)t] \quad (2)$$

The LPFs 204c and 204d filter out the high-frequency components ($\omega_1 + \omega_2$) from the output signals of the multipliers 204a and 204b and thereby produce analog baseband I/Q signals (and the inverted signals Ix and Qx thereof) given by formula (3) and (4) below.

$$I = \frac{ab}{2}\sin(\omega_1 - \omega_2)t \quad (3)$$

$$Q = \frac{ab}{2}\cos(\omega_1 - \omega_2)t \quad (4)$$

Figure 3:
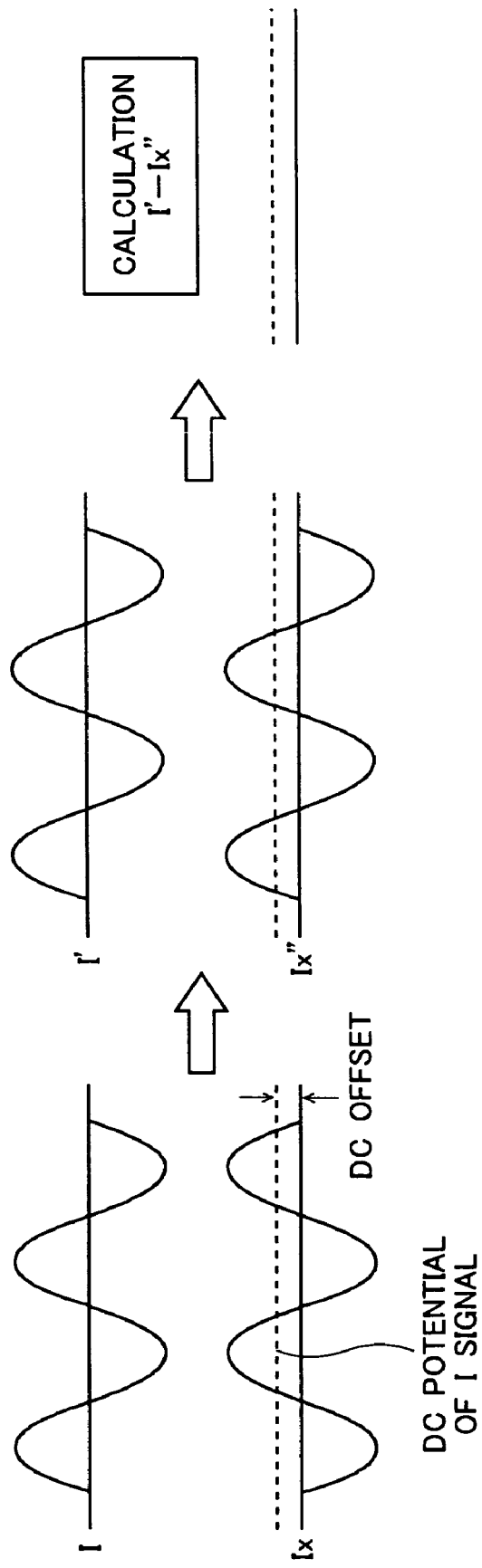
FIGS. 3A to 3C are diagrams illustrating how the DC offset amount is detected.

Under ideal conditions, the I and Ix signals (or the Q and Qx signals) have an equal DC potential and are 180 degrees out of phase with each other. In reality, however, owing to self-mixing, i.e., the phenomenon in which the local oscillation signals leak to the opposite terminals of the multipliers 204a and 204b, or owing to variations between individual devices, a DC offset appears, resulting in a difference in the DC potential between the two signals (see FIG. 3A).

To detect the DC offset amount mentioned above, the offset amount detection circuit 206 of this embodiment includes delay circuits 206a and 206b and subtraction circuits 206c and 206d. In the offset detection mode, the delay circuits 206a and 206b produce delayed inverted signals Ix" and Qx" by giving a delay equal to half the period to, of the digital baseband I/Q signals I' and Q' and the inverted signals Ix' and Qx' thereof all obtained from the A/D converter 205, the inverted signals Ix' and Qx' obtained from the A/D converters 205b and 205d. The non-inverted signals I' and Q' obtained from the A/D converters 205a and 205c and the delayed inverted signals Ix" and Qx" obtained from the delay circuits 206a and 206b are in phase with each other but have different DC potentials (see FIG. 3B). Accordingly, by making the subtraction circuits 206c and 206d subtract the signals Ix" and Qx" from the signals I' and Q', it is possible to obtain the DC offset amounts of the digital baseband I/Q signals (see FIG. 3C). In this way, in the I/Q demodulation circuit of this embodiment, the symmetry and periodicity of the reference sinusoidal wave signal are exploited to determine, through simple calculations, the DC offset amounts of the digital baseband I/Q signals.

Figure 4:
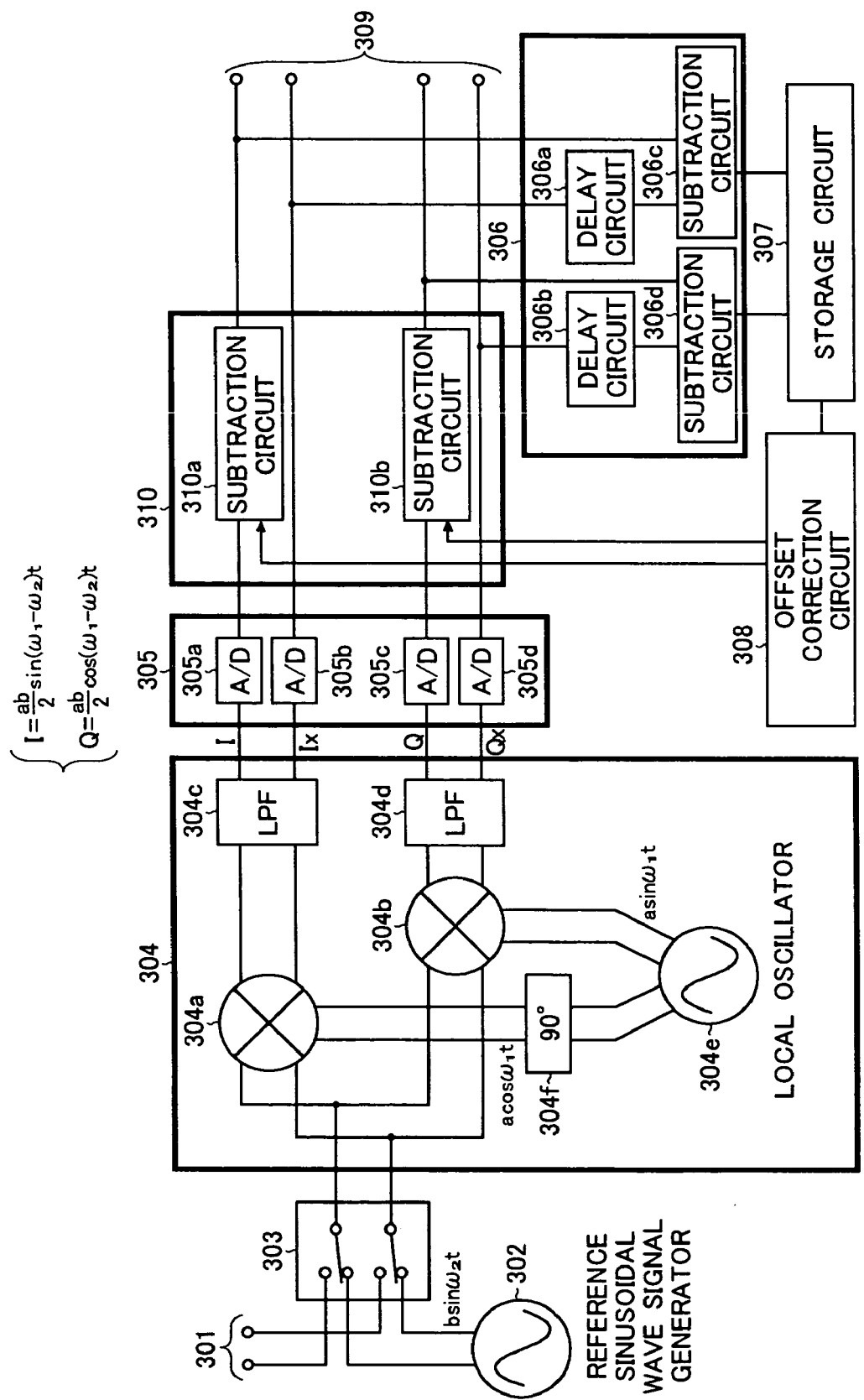
FIG. 4 is a block diagram showing the I/Q demodulation circuit of a third embodiment of the invention.

Next, the I/Q demodulation circuit of a third embodiment of the invention will be presented to describe an example of the DC offset correcting means in detail. FIG. 4 is a block diagram showing the I/Q demodulation circuit of the third embodiment of the invention. As shown in this figure, the I/Q demodulation circuit of this embodiment, like that of the first embodiment, includes input terminals 301, a reference sinusoidal wave signal generator 302, a selector 303, an I/Q demodulator 304, an A/D converter 305, an offset amount detection circuit 306, a storage circuit 307, an offset correction circuit 308, and output terminals 309. In addition to these, the I/Q demodulation circuit of this embodiment further includes a controlled circuit 310 that is controlled by the offset correction circuit 308.

The controlled circuit 310 mentioned above includes subtraction circuits 310a and 310b that are connected in the stage following the A/D converters 305a and 305c. In the normal reception mode, the controlled circuit 310 subtracts, from the digital baseband I/Q signals, DC offset amounts conforming to an instruction from the offset correction circuit 308. With this configuration, at the output terminals 309 appear demodulation results that are free from a DC offset.

Figure 5:
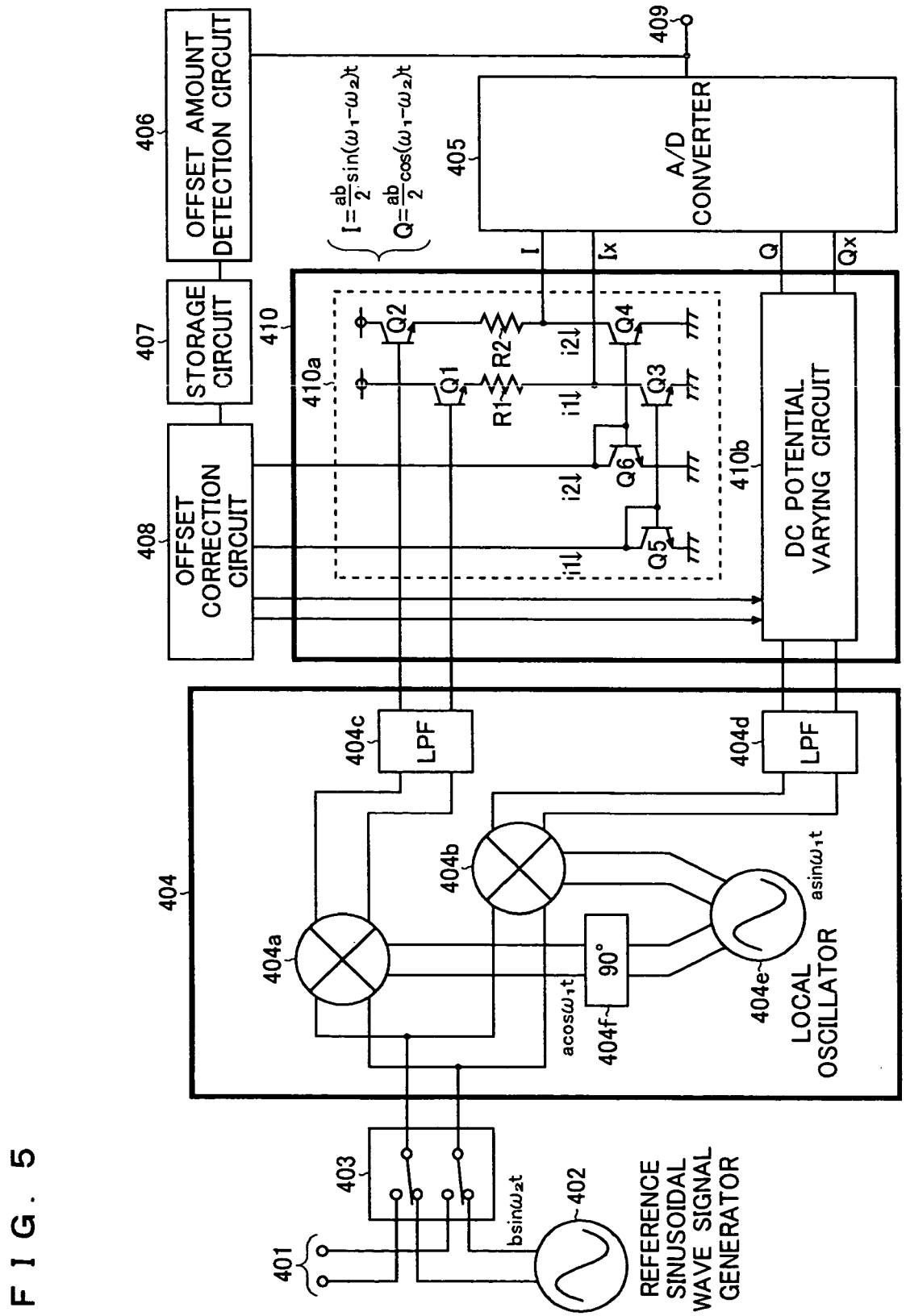
FIG. 5 is a block diagram showing the I/Q demodulation circuit of a fourth embodiment of the invention.

Next, the I/Q demodulation circuit of a fourth embodiment of the invention will be presented to describe another example of the DC offset correcting means in detail. FIG. 5 is a block diagram (including a circuit diagram as part thereof) showing the I/Q demodulation circuit of the fourth embodiment of the invention. As shown in this figure, the I/Q demodulation circuit of this embodiment, like that of the first embodiment, includes input terminals 401, a reference sinusoidal wave signal generator 402, a selector 403, an I/Q demodulator 404, an A/D converter 405, an offset amount detection circuit 406, a storage circuit 407, an offset correction circuit 408, and output terminals 409. In addition to these, the I/Q demodulation circuit of this embodiment further includes a controlled circuit 410 that is controlled by the offset correction circuit 408.

The controlled circuit 410 mentioned above includes DC potential varying circuits 410a and 410b connected between the LPFs 404c and 404d and the A/D converter 405. In the normal reception mode, the controlled circuit 410 varies the DC potentials of the analog baseband I/Q signals according to an instruction from the offset correction circuit 408. With this configuration, at the output terminals 409 appear demodulation results that are free from a DC offset.

Now, the internal configuration and operation of the DC potential varying circuits 410a and 410b will be described in detail. As shown in FIG. 5, the DC potential varying circuit 410a includes npn-type bipolar transistors Q1 to Q6 and resistors R1 and R2. The bases of the transistors Q1 and Q2 are connected respectively to the differential output terminals of the LPF 404c. The collectors of the transistors Q1 and Q2 are both connected to a supply voltage line. The emitters of the transistors Q1 and Q2 are connected respectively through the resistors R1 and R2 to the collectors of the transistors Q3 and Q4. The nodes between the resistors R1 and R2 and the transistors Q3 and Q4 serve as the output terminals of the DC potential varying circuit 410a, and are connected to the differential input terminals of the A/D converter 405. The emitters of the transistors Q3 and Q4 are both grounded. The bases of the transistors Q3 and Q4 are connected respectively to the bases of the transistors Q5 and Q6. The emitters of the transistors Q5 and Q6 are both grounded. The collectors of the transistors Q5 and Q6 are connected to their own bases, and are also connected to the output terminals of the offset correction circuit 408. In short, the DC potential varying circuit 410a consists of an emitter follower circuit formed by the transistors Q1 and Q2 and a current mirror circuit formed by the transistors Q3 to Q6. The DC potential varying circuit 410b has the same configuration as described above.

In the normal reception mode, the offset correction circuit 408 reads the DC offset amounts stored in the storage circuit 407, and passes control currents i1 and i2 corresponding thereto through the collectors of the transistors Q5 and Q6. At this time, through the collectors of the transistors Q3 and Q4 flow mirror currents i1 and i2 of the same magnitudes as the control currents i1 and i2 (or mirror currents i1' and i2' proportional to the control currents i1 and i2). Thus, the DC potentials of the I and Ix signals are controlled to vary by the control currents i1 and i2.

Figure 6:
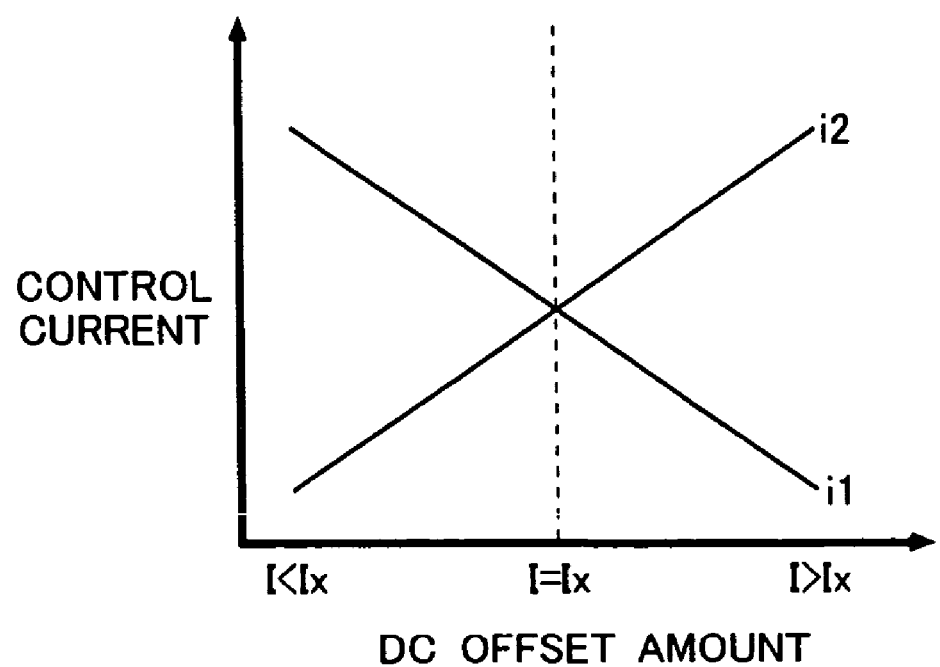
FIG. 6 is a diagram showing the relationship between the control currents i1 and i2 and the DC offset amounts.

FIG. 6 is a diagram showing the relationship between the control currents i1 and i2 and the DC offset amounts. As shown in this figure, when no DC offset exists between the I and Ix signals, the control currents i1 and i2 are of the same magnitude, and thus the I and Ix signals have an equal DC potential. By contrast, when a DC offset appears between the I and Ix signals so that the DC potential of the I signal becomes higher than the DC potential of the Ix signal, the offset correction circuit 408 increases the control current i2 and decreases the control current i1. Under this control, the mirror current i2 flowing through the resistor R2 increases and the mirror current i1 flowing through the resistor R1 decreases, with the result that the DC potential of the I signal decreases and the DC potential of the Ix signal increases. Thus, the DC potentials of the I and Ix signals become equal, and, in this way, the DC offset between the two signals is canceled. Reversely, when the DC potential of the I signal becomes lower than the DC potential of the Ix signal, the control current i2 is decreased and the control current i1 is increased so that, in a similar manner as described above, the DC offset is cancelled.

Figure 7:
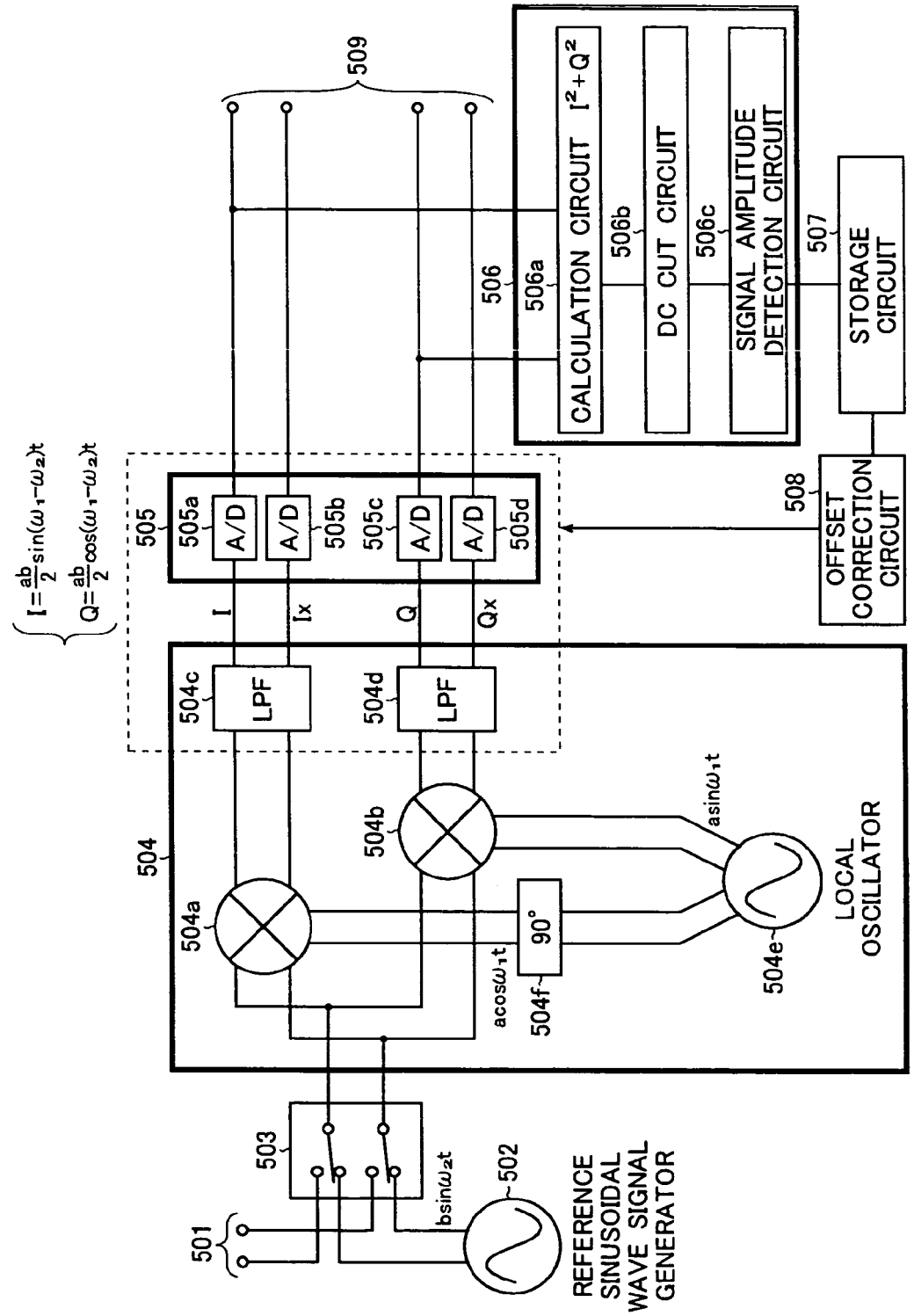
FIG. 7 is a block diagram showing the I/Q demodulation circuit of a fifth embodiment of the invention.

Next, the I/Q demodulation circuit of a fifth embodiment of the invention will be presented to describe an example of the phase offset amount detecting means in detail. FIG. 7 is a block diagram showing the I/Q demodulation circuit of the fifth embodiment of the invention. As shown in this figure, the I/Q demodulation circuit of this embodiment, like that of the first embodiment, includes input terminals 501, a reference sinusoidal wave signal generator 502, a selector 503, an I/Q demodulator 504, an A/D converter 505, an offset amount detection circuit 506, a storage circuit 507, an offset correction circuit 508, and output terminals 509.

To detect the phase offset amount of the digital baseband I/Q signals, the offset amount detection circuit 506 of this embodiment includes a calculation circuit 506a, a DC cut circuit 506b, and a signal amplitude detection circuit 506c. In the offset detection mode, the calculation circuit 506a calculates the square sum ($I^2+Q^2$) of the digital baseband I/Q signals obtained from the A/D converter 505. Here, under ideal conditions without a phase offset, as expressed by formula (5) below, no AC component appears in the calculation result.

$$\left[\frac{ab}{2}\sin(\omega_1 - \omega_2)t\right]^2 + \left[\frac{ab}{2}\cos(\omega_1 - \omega_2)t\right]^2 = \frac{a^2b^2}{4} \quad (5)$$

In reality, however, owing to an error originating in the 90-degree phase shifter 504f and other factors, a phase offset appears, causing the phase difference between the two signals to deviate from 90 degrees. Thus, as expressed by formula (6) below, an AC component appears in the calculation result. In this formula, a represents the phase offset amount.

$$\left\{\frac{ab}{2}\sin[(\omega_1-\omega_2)t+\alpha]\right\}^2 + \left[\frac{ab}{2}\cos(\omega_1-\omega_2)t\right]^2 = \qquad (6)$$
$$\frac{a^2b^2}{4}+\frac{a^2b^2}{4}\sin\alpha\times\sin[2(\omega_1-\omega_2)t+\alpha]$$

Here, so long as a is small, it is possible to make the approximation sin a≈a. Thus, the amplitude of the AC component mentioned above is proportional to the phase offset amount a. Accordingly, by making the DC cut circuit 506b extract the AC component from the output signal of the calculation circuit 506a, and then making the signal amplitude detection circuit 506c detect the amplitude of that AC component, it is possible to determine the phase offset amount of the digital baseband I/Q signals. In this way, in the I/Q demodulation circuit of this embodiment, the correlation between the amplitude of the AC component appearing in the square sum of the I/Q signals and the phase offset amount is exploited to determine, through simple calculations, the phase offset amount of the digital baseband I/Q signals.

Figure 8:
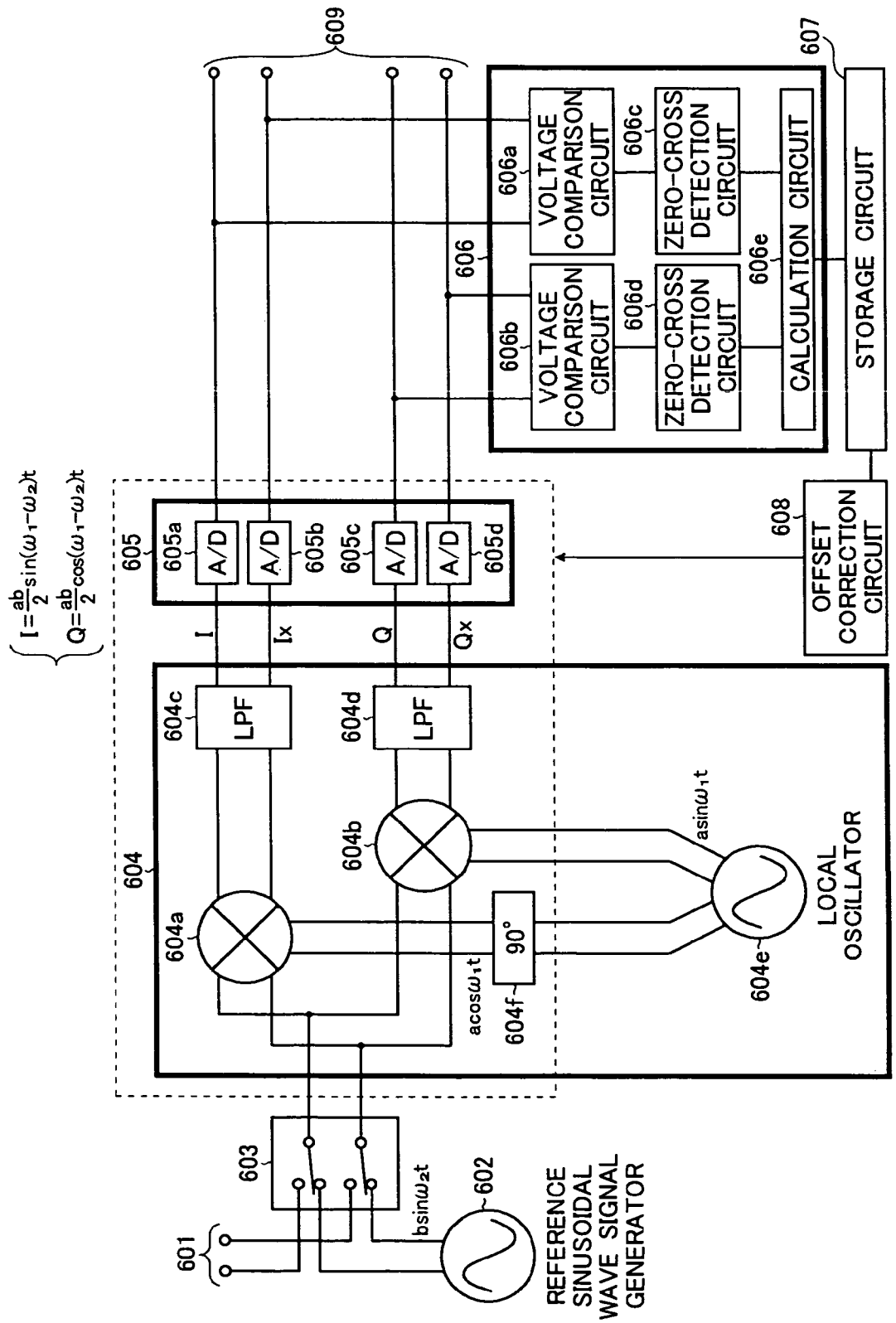
FIG. 8 is a block diagram showing the I/Q demodulation circuit of a sixth embodiment of the invention.

Next, the I/Q demodulation circuit of a sixth embodiment of the invention will be presented to describe another example of the phase offset amount detecting means in detail. FIG. 8 is a block diagram showing the I/Q demodulation circuit of the sixth embodiment of the invention. As shown in this figure, the I/Q demodulation circuit of this embodiment, like that of the first embodiment, includes input terminals 601, a reference sinusoidal wave signal generator 602, a selector 603, an I/Q demodulator 604, an A/D converter 605, an offset amount detection circuit 606, a storage circuit 607, an offset correction circuit 608, and output terminals 609.

Figure 9A:
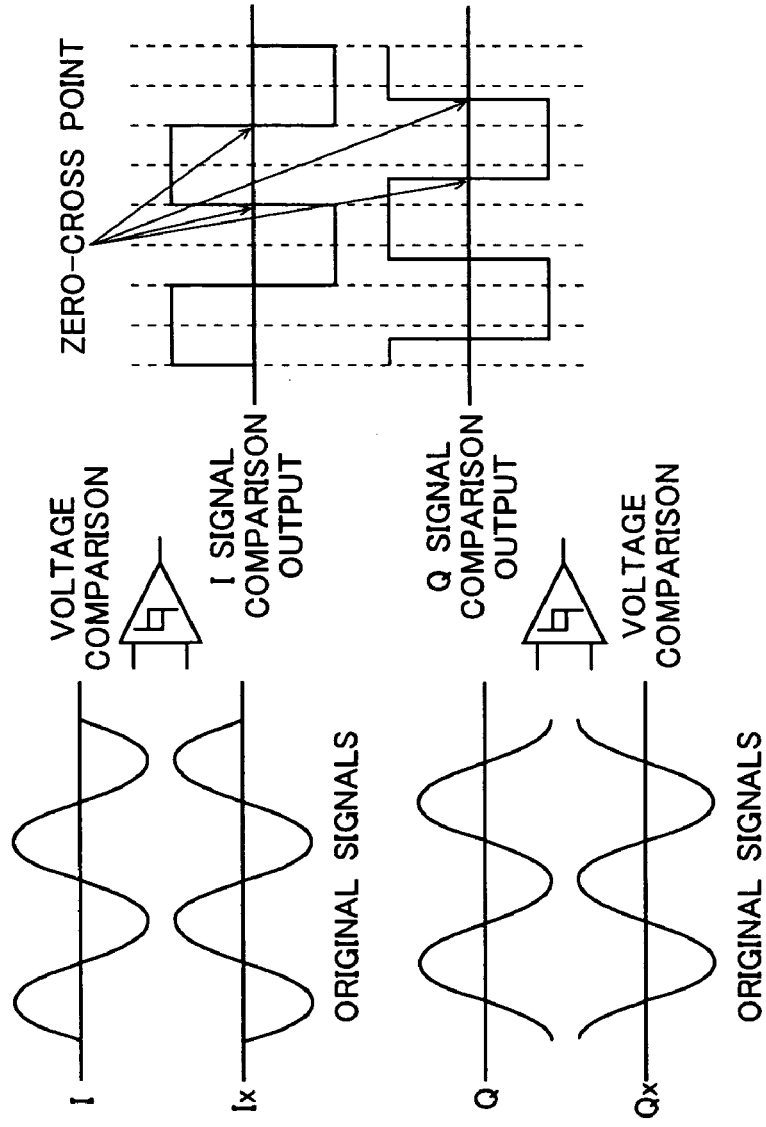
FIGS. 9A to 9C are diagrams illustrating how the phase offset amount is detected.
Figure 9B:
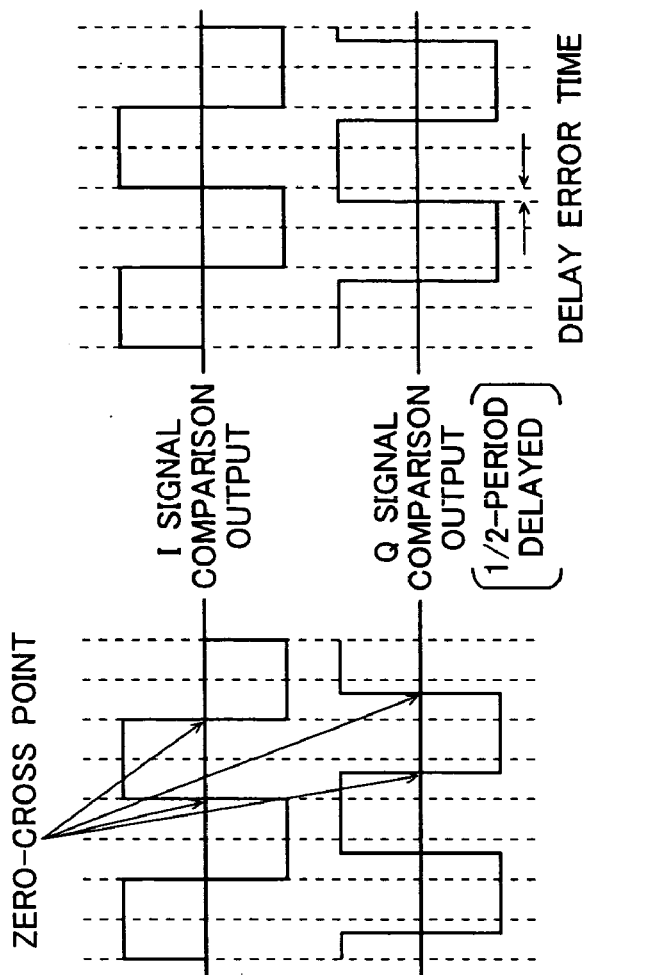
Figure 9C:
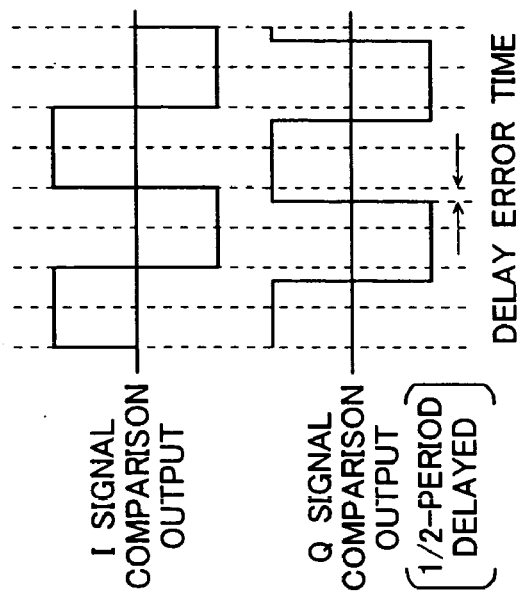

To detect the phase offset amount of the digital baseband I/Q signals, the offset amount detection circuit 606 of this embodiment includes voltage comparison circuits 606a and 606b, zero-cross point detection circuits 606c and 606d, and a calculation circuit 606e. In the offset detection mode, the voltage comparison circuit 606a compares the voltages of the I and Ix signals digitized by the A/D converter 605 (see FIG. 9A). Operating in a similar manner, the voltage comparison circuit 606b compares the voltages of the Q and Qx signals. Next, the zero-cross point detection circuits 606c and 606d determine the time points (zero-cross points) at which the voltages of the I and Ix signals, on one hand, and the voltages of the Q and Qx signals, on the other hand, become equal to each other and thus the output signals of the voltage comparison circuits 606a and 606b become equal to zero (see FIG. 9B). Lastly, the calculation circuit 606e compares the zero-cross point of the I signal with the zero-cross point, as shifted by half the period, of the Q signal to determine the delay error time (see FIG. 9C).

Here, between the delay error time and the phase offset error, the correlation given by formula (7) below holds.

$$(\text{Delay Time}) = \frac{(\text{Phase Offset Amount})}{\omega_1-\omega_2} \qquad (7)$$

Accordingly, by making the calculation circuit 606e determine the delay error time, it is possible to determine the phase offset amount of the digital baseband I/Q signals.

Figure 10:
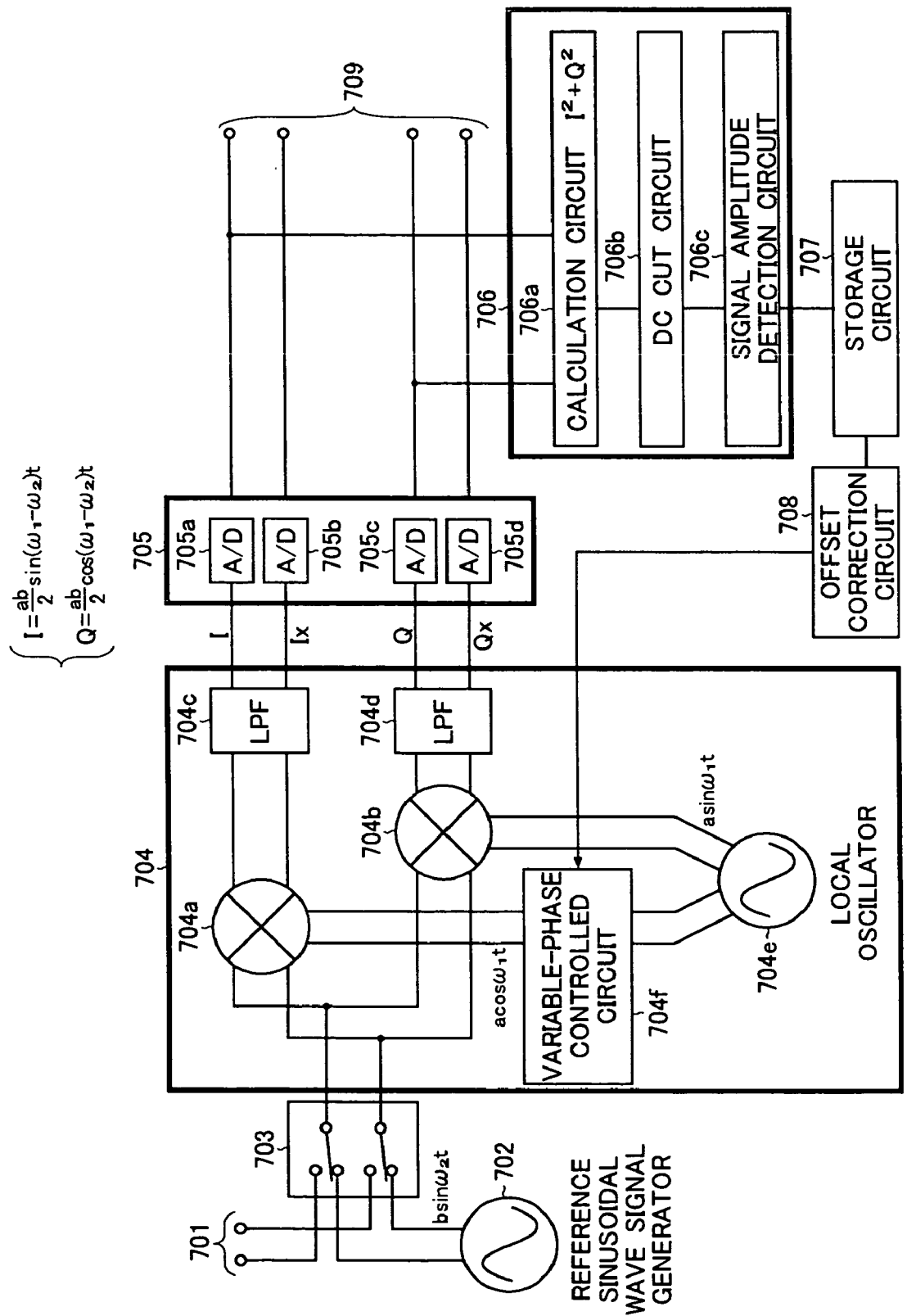
FIG. 10 is a block diagram showing the I/Q demodulation circuit of a seventh embodiment of the invention.

Next, the I/Q demodulation circuit of a seventh embodiment of the invention will be presented to describe an example of the phase offset correcting means in detail. FIG. 10 is a block diagram showing the I/Q demodulation circuit of the seventh embodiment of the invention. As shown in this figure, the I/Q demodulation circuit of this embodiment, like that of the first embodiment, includes input terminals 701, a reference sinusoidal wave signal generator 702, a selector 703, an I/Q demodulator 704, an A/D converter 705, an offset amount detection circuit 706, a storage circuit 707, an offset correction circuit 708, and output terminals 709. Here, the I/Q demodulator 704 of this embodiment includes, as a substitute for a 90-degree phase shifter, a variable-phase controlled circuit 704f controlled by the offset correction circuit 708. In normal reception mode, the variable-phase controlled circuit 704f varies the phase of the local oscillation signal by a phase offset amount conforming to an instruction from the offset correction circuit 708. With this configuration, at the output terminals 709 appear demodulation results that are free from a phase offset.

FIG. 11 is a circuit diagram showing an example of the configuration of the variable-phase controlled circuit 704f. As shown in this figure, the variable-phase controlled circuit 704f of this embodiment includes differential transconductance amplifiers OTA1 to OTA5 (with transconductances Gm1 to Gm5 respectively) and capacitors C1 to C4 (with capacitances Ca, Cb, 2Cx, and 2Cx respectively).

The local oscillation signal is differentially fed in via input terminals T1 and T2, which are connected respectively to the non-inverting input terminal (+) and inverting input terminal (−) of each of the amplifiers OTA4 and OTA5. The non-inverting output terminal (+) of the amplifier OTA4 is connected to the inverting output terminal (−) of the amplifier OTA1, to the non-inverting input terminal (+) of the amplifier OTA2, and to one terminal of the capacitor C1. The inverting output terminal (−) of the amplifier OTA4 is connected to the non-inverting output terminal (+) of the amplifier OTA1, to the inverting input terminal (−) of the amplifier OTA2, and to the other terminal of the capacitor C1. The non-inverting output terminal (+) of the amplifier OTA5 is connected to the non-inverting output terminal (+) of the amplifier OTA2, to the non-inverting input terminal (+) of the amplifier OTA3, and to one terminal of the capacitor C2. The inverting output terminal (−) of the amplifier OTA5 is connected to the inverting output terminal (−) of the amplifier OTA2, to the inverting input terminal (−) of the amplifier OTA3, and to the other terminal of the capacitor C2. The non-inverting output terminal (+) and inverting output terminal (−) of the amplifier OTA5 are also connected respectively through capacitors C3 and C4 to the input terminals T1 and T2. The non-inverting output terminal (+) of the amplifier OTA3 is connected to an output terminal T4, to the inverting input terminal (−) of the amplifier OTA1, and to the inverting input terminal (−) of the amplifier OTA3 itself. The inverting output terminal (−) of the amplifier OTA3 is connected to an output terminal T3, to the non-inverting input terminal (+) of the amplifier OTA1, and to the non-inverting input terminal (+) of the amplifier OTA3 itself.

Configured as a second-order low-pass filter as described above, the variable-phase controlled circuit 704f outputs, at the cutoff frequency fc thereof, a signal 90 degrees out of phase with the signal inputted thereto. The cutoff frequency fc of the variable-phase controlled circuit 704f depends, as expressed by formula (8) below, on the transconductances Gm1 and Gm2 and the electrostatic capacitances Ca, Cb, and Cx.

$$fc = \frac{1}{2\pi}\sqrt{\frac{Gm1 \cdot Gm2}{Ca(Cx+Cb)}} \quad (8)$$

Accordingly, the variable-phase controlled circuit 704f of this embodiment is so configured that the parameters mentioned above are individually varied according to an instruction from the offset correction circuit 708. With this configuration, it is possible to freely control the phase of the local oscillation signal according to the cutoff frequency fc of the variable-phase controlled circuit 704f.

Figure 12:
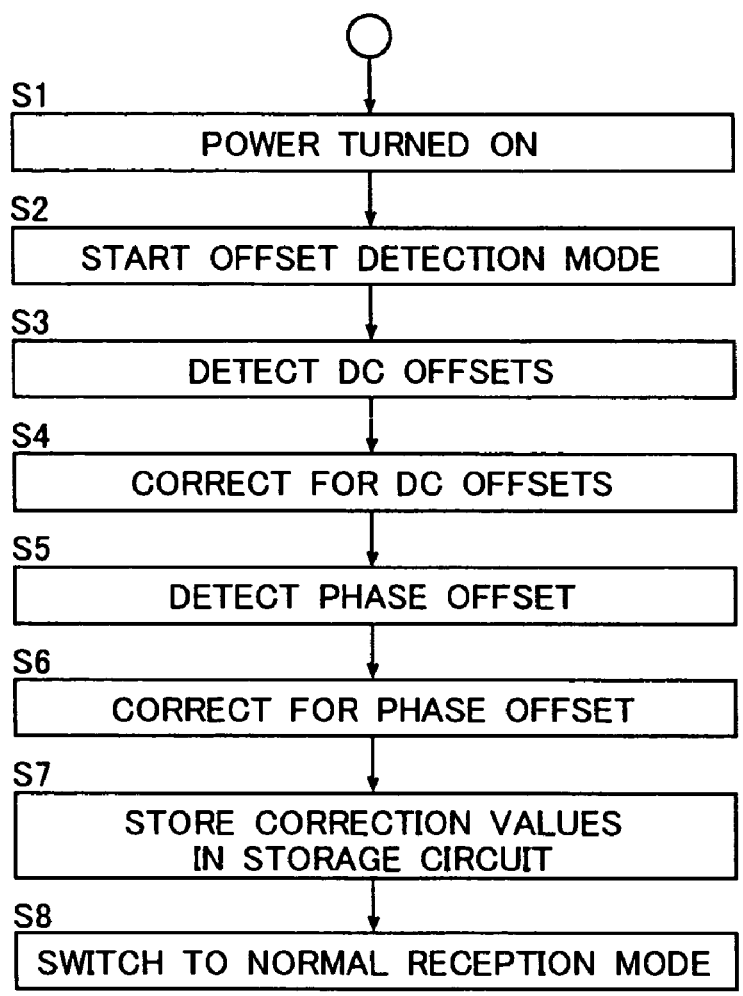
FIG. 12 is a flow chart showing an example of the offset correction operation.

Next, a description will be given of the procedure for effecting the correction of the DC offsets and phase offset described above. FIG. 12 is a flow chart showing an example of the operations performed to correct for the offsets. As shown in this flow chart, in an I/Q demodulation circuit according to the invention, immediately after the power is turned on in step S1, first, in step S2, the operation mode is set to the offset detection mode, and then, in step S3, the DC offset amounts are detected on the basis of the reference sinusoidal wave signal. Then, in step S4, the DC offsets are corrected for before the detection of the phase offset amount. Subsequently, in step S5, the phase offset amount is detected on the basis of the reference sinusoidal wave signal, and then, in step S6, the phase offset is corrected for. Then, in step S7, the correction values are stored in the storage circuit, and then, in step S8, the operation mode is switched to the normal reception mode. The reason that this procedure is followed is as follows.

As described earlier, the DC offset amounts are detected on the basis of the I and Ix signals (or the Q and Qx signals). Thus, even if a phase offset exists between the I and Q signals, the DC offset amounts can be detected correctly. On the other hand, if a DC offset exists in the I/Q signals when the phase offset amount is detected, as expressed by formula (9) below, even when no phase offset exists, an AC component appears in the calculated result of the square sum of the digital baseband I/Q signals. This makes it impossible to detect the phase offset correctly.

$$\left[\beta + \frac{ab}{2}\sin(\omega_1 - \omega_2)t\right]^2 + \left[\frac{ab}{2}\cos(\omega_1 - \omega_2)t\right]^2 = \frac{a^2b^2}{4} + ab\beta\sin(\omega_1 - \omega_2)t \quad (9)$$

This is the reason that, in an I/Q demodulation circuit according to the invention, the DC offset amounts are corrected for before the phase offset amount is detected. With this configuration, it is possible to avoid erroneous detection of the phase offset amount due to the presence of a DC offset. Incidentally, a high-pass filter may be provided in the stage immediately following the calculation circuit for calculating the square sum of the I/Q signals, with the cutoff frequency of the high-pass filter so set that the ($\omega_1$-$\omega_2$) component is eliminated and only the 2($\omega_1$-$\omega_2$) component is passed. This also makes it possible to avoid erroneous detection of the phase offset amount without previously canceling a DC offset. This configuration, however, has large disadvantages, as by requiring a higher-order filter, and therefore, to build a simple system, it is preferable to correct for the DC offsets before the phase offset amount is detected.

Figure 13:
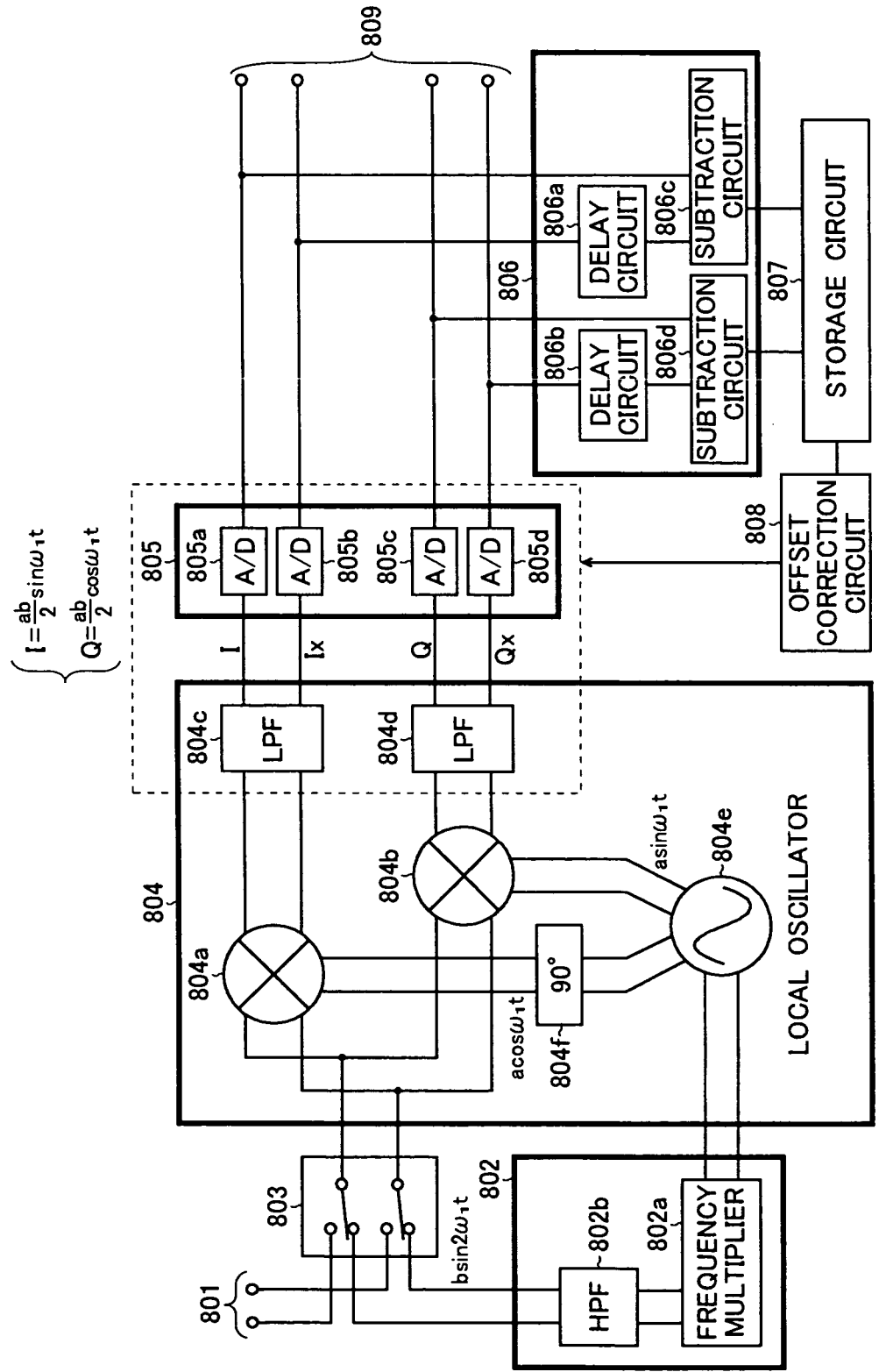
FIG. 13 is a block diagram showing the I/Q demodulation circuit of an eighth embodiment of the invention.

Next, the I/Q demodulation circuit of an eighth embodiment of the invention will be presented to describe an example of the reference sinusoidal wave signal generating means in detail. FIG. 13 is a block diagram showing the I/Q demodulation circuit of the eighth embodiment of the invention. As shown in this figure, the I/Q demodulation circuit of this embodiment, like that of the first embodiment, includes input terminals 801, a reference sinusoidal wave signal generator 802, a selector 803, an I/Q demodulator 804, an A/D converter 805, an offset amount detection circuit 806, a storage circuit 807, an offset correction circuit 808, and output terminals 809. Here, the reference sinusoidal wave signal generator 802 of this embodiment includes a frequency multiplier 802a for multiplying by a factor of two the local oscillation signal (a sin $\omega_1$t) produced by the local oscillator 804e, and a high-pass filter 802b for preventing the local oscillation signal from mixing with the multiplied signal (b sin 2$\omega_1$t). That is, here, instead of separately providing an oscillation source for generating the reference sinusoidal wave signal, the local oscillation signal that is indispensable for I/Q demodulation is used. This helps avoid unnecessarily increasing the circuit scale. This embodiment deals with, as a mere example, a configuration where the local oscillation signal is multiplied, but it should be understood that the invention may be implemented in any other configuration. For example, the local oscillation signal may be divided so as to be used as the reference sinusoidal wave signal.

Figure 14:
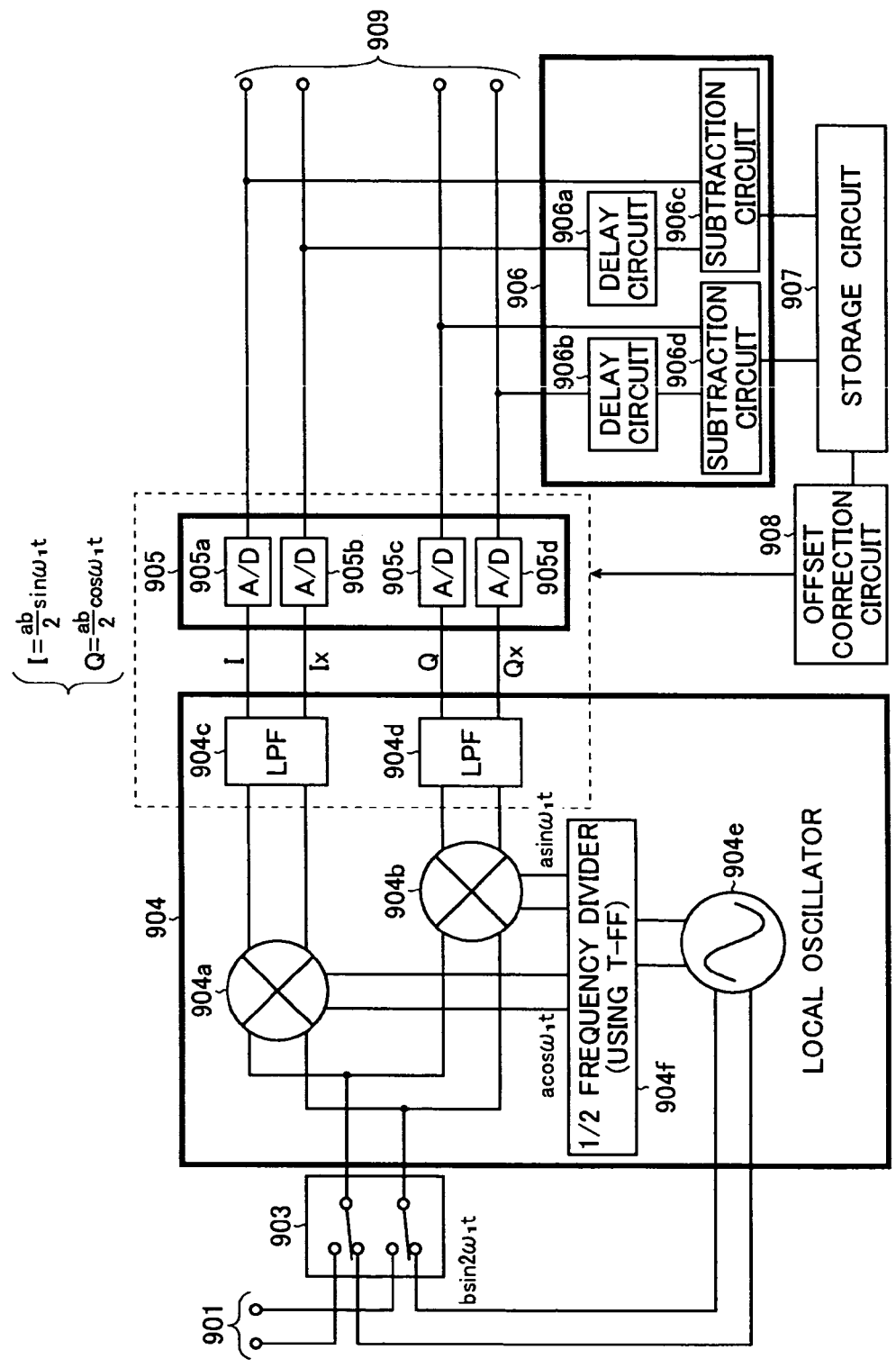
FIG. 14 is a block diagram showing the I/Q demodulation circuit of a ninth embodiment of the invention.
Figure 15:
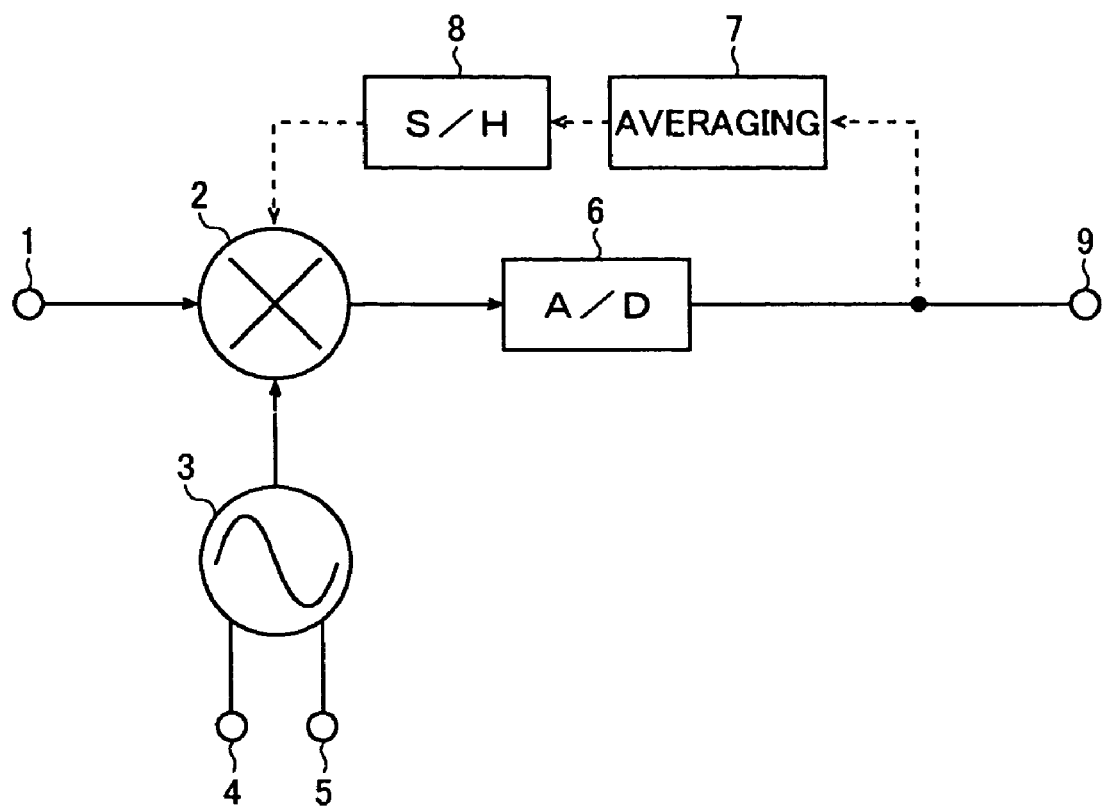
FIG. 15 is a block diagram showing a principal portion of the mixer circuit disclosed in Japanese Patent Application Laid-Open No. H10-303649.

Lastly, the I/Q demodulation circuit of a ninth embodiment of the invention will be presented to describe another example of the reference sinusoidal wave signal generating means in detail. FIG. 14 is a block diagram showing the I/Q demodulation circuit of the ninth embodiment of the invention. As shown in this figure, the I/Q demodulation circuit of this embodiment, like that of the first embodiment, includes input terminals 901, a selector 903, an I/Q demodulator 904, an A/D converter 905, an offset amount detection circuit 906, a storage circuit 907, an offset correction circuit 908, and output terminals 909. Here, the local oscillator 904e of the I/Q demodulator 904 is shared as the reference sinusoidal wave signal generator. That is, in the I/Q demodulation circuit of this embodiment, the output signal of the local oscillator 904e is branched into two signals, of which one is used as the reference sinusoidal wave signal and the other as the local oscillation signal. Here, the oscillation frequency of the local oscillator 904e is made equal to twice the frequency needed for I/Q demodulation.

The I/Q demodulator 904 of this embodiment includes, as a substitute for a 90-degree phase shifter, a ½ frequency divider 904f built with a T-flipflop. This ½ frequency divider 904f outputs two signals (a sin $\omega_1$t and a cos $\omega_1$t) that have half the frequency of the output signal (b sin 2$\omega_1$t) of the local oscillator 904e and that are 90 degrees out of phase with each other. This permits the output signal to be shared as the local oscillation signal. In this way, instead of separately providing an oscillation source for generating the reference sinusoidal wave signal, the local oscillator that is indispensable for I/Q demodulation is used. This helps avoid unnecessarily increasing the circuit scale.

As described above, with an I/Q demodulation circuit according to the invention, it is possible to correct for a DC offset and a phase offset without a delay during an I/Q demodulation operation.

An I/Q demodulation circuit according to the invention proves to be useful as a signal demodulating means in digital broadcast reception apparatuses and the like, and contributes to increasing the reception accuracy of such apparatuses.

What is claimed is:

1. An I/Q demodulation circuit comprising:
an I/Q demodulator for producing an analog I/Q signal by multiplying an input signal by a local oscillation signal;
an analog-to-digital converter for converting the analog I/Q signal into a digital I/Q signal;
a reference sinusoidal-wave signal generator for producing a predetermined reference sinusoidal-wave signal;
a selector for selecting and feeding to the I/Q demodulator one of an external input signal and the reference sinusoidal-wave signal;
an offset amount detection circuit for detecting a DC offset amount and a phase offset amount of the digital I/Q signal obtained when the reference sinusoidal-wave signal is selected;
a storage circuit for storing a result of detection by the offset amount detection circuit or a correction value with which to correct for the result; and
an offset correction circuit for correcting for, based on data stored in the storage circuit, a DC offset and a phase offset of the digital I/Q signal obtained when the external input signal is selected,
wherein the offset amount detection circuit includes:
a delay circuit for producing a delayed inverted signal by delaying, of two versions of the digital I/Q signal differentially fed thereto, an inverted digital I/Q signal by a half period; and
a subtraction circuit for determining the DC offset amount by subtracting the delayed inverted signal from a non-inverted digital I/Q signal.

2. The I/Q demodulation circuit of claim 1, further comprising:
a controlled circuit for subtracting from the digital I/Q signal a DC offset amount conforming to an instruction from the offset correction circuit.

3. The I/Q demodulation circuit of claim 1, further comprising:
a controlled circuit for varying a DC potential of the analog I/Q signal according to an instruction from the offset correction circuit.

4. The I/Q demodulation circuit of claim 1,
wherein the offset amount detection circuit includes:
a calculation circuit for calculating a square sum of the digital I/Q signal;
a DC cut circuit for extracting only an alternating-current component from an output signal of the calculation circuit; and
a signal amplitude detection circuit for determining the phase offset by detecting an amplitude of the alternating-current component.

5. An I/Q demodulation circuit comprising:
an I/Q demodulator for producing an analog I/Q signal by multiplying an input signal by a local oscillation signal;
an analog-to-digital converter for converting the analog I/Q signal into a digital I/Q signal;
a reference sinusoidal-wave signal generator for producing a predetermined reference sinusoidal-wave signal;
a selector for selecting and feeding to the I/Q demodulator one of an external input signal and the reference sinusoidal-wave signal;
an offset amount detection circuit for detecting a DC offset amount and a phase offset amount of the digital I/Q signal obtained when the reference sinusoidal-wave signal is selected;
a storage circuit for storing a result of detection by the offset amount detection circuit or a correction value with which to correct for the result; and
an offset correction circuit for correcting for, based on data stored in the storage circuit, a DC offset and a phase offset of the digital I/Q signal obtained when the external input signal is selected,
wherein the offset amount detection circuit includes:
a voltage comparison circuit for comparing, with respect to two versions of the digital I/Q signal differentially fed thereto, an I signal with an inverted signal thereof and a Q signal and an inverted signal thereof;
a zero-cross point detection circuit for determining a time point at which an output signal of the voltage comparison circuit becomes equal to zero; and
a calculation circuit for determining the phase offset by comparing a zero-cross point of the I signal and a zero-cross point of the Q signal shifted by half a period.

6. The I/Q demodulation circuit of claim 1,
wherein the I/Q demodulator includes:
a variable-phase controlled circuit for varying a phase of the local oscillation signal by a phase offset amount conforming to an instruction from the offset correction circuit.

7. The I/Q demodulation circuit of claim 6,
wherein the variable-phase controlled circuit includes:
an active filter of which a cutoff frequency is controlled to vary according to an instruction from the offset correction circuit.

8. The I/Q demodulation circuit of claim 1,
wherein the DC offset is corrected for before the phase offset amount is detected.

9. The I/Q demodulation circuit of claim 1,
wherein the reference sinusoidal-wave signal generator includes:
a frequency multiplier for producing the reference sinusoidal-wave signal by multiplying a frequency of the local oscillation signal.

10. The I/Q demodulation circuit of claim 1,
wherein the reference sinusoidal-wave signal generator includes:
a frequency divider for producing the reference sinusoidal-wave signal by dividing a frequency of the local oscillation signal.

11. An I/Q demodulation circuit comprising:
an I/Q demodulator for producing an analog I/Q signal by multiplying an input signal by a local oscillation signal;
an analog-to-digital converter for converting the analog I/Q signal into a digital I/Q signal;
a reference sinusoidal-wave signal generator for producing a predetermined reference sinusoidal-wave signal;
a selector for selecting and feeding to the I/Q demodulator one of an external input signal and the reference sinusoidal-wave signal;
an offset amount detection circuit for detecting a DC offset amount and a phase offset amount of the digital I/Q signal obtained when the reference sinusoidal-wave signal is selected;
a storage circuit for storing a result of detection by the offset amount detection circuit or a correction value with which to correct for the result;
an offset correction circuit for correcting for, based on data stored in the storage circuit, a DC offset and a phase offset of the digital I/Q signal obtained when the external input signal is selected; and
a ½ frequency divider for producing two signals having half a frequency of the reference sinusoidal-wave signal and having a phase difference of 90 degrees relative to each other,
wherein an output signal of the ½ frequency divider is used as the local oscillation signal.

12. An I/Q demodulation circuit comprising:
an I/Q signal generation circuit for producing an I/Q signal from an input signal;
an offset amount detection circuit for detecting an offset amount of the I/Q signal; and
a storage circuit for storing the offset amount or a value with which to correct for the offset amount,
wherein an offset of the I/Q signal is corrected for based on data stored in the storage circuit, and
wherein the offset amount detection circuit includes:
a delay circuit for producing a delayed inverted signal by delaying, of two versions of the I/Q signal differentially fed thereto, an inverted I/Q signal by half a period; and
a subtraction circuit for determining the DC offset amount by subtracting the delayed inverted signal from a non-inverted I/Q signal.

* * * * *